US010875433B2

(12) United States Patent
Hammadi et al.

(10) Patent No.: US 10,875,433 B2
(45) Date of Patent: Dec. 29, 2020

(54) VEHICLE SEAT WITH SIMULTANEOUS CONTROL OF THE HEADREST AND BELT SUPPORT

(71) Applicant: FAURECIA Sièges d'Automobile, Nanterre (FR)

(72) Inventors: Sémir Hammadi, Saulx les Chartreux (FR); Philippe Duhamel, Saulx les Chartreux (FR)

(73) Assignee: FAURECIA Sièges d'Automobile, Nanterre (FR)

(*) Notice: Subject to any disclaimer, the term of this patent is extended or adjusted under 35 U.S.C. 154(b) by 0 days.

(21) Appl. No.: 16/564,443

(22) Filed: Sep. 9, 2019

(65) Prior Publication Data

US 2020/0079264 A1    Mar. 12, 2020

(30) Foreign Application Priority Data

Sep. 12, 2018   (FR) ..................................... 18 58174

(51) Int. Cl.
*B60R 22/28*    (2006.01)
*B60N 2/829*    (2018.01)
(Continued)

(52) U.S. Cl.
CPC .............. *B60N 2/829* (2018.02); *B60N 2/688* (2013.01); *B60R 22/20* (2013.01); *B60R 2022/1818* (2013.01)

(58) Field of Classification Search
CPC ........ B60N 2/829; B60N 2/832; B60R 22/26; B60R 22/20
See application file for complete search history.

(56) References Cited

U.S. PATENT DOCUMENTS 5,330,228 A * 7/1994 Krebs .................... B60N 2/829
                                                                280/801.2
5,390,982 A * 2/1995 Johnson ................. B60N 2/888
                                                                297/410
(Continued)

FOREIGN PATENT DOCUMENTS

DE       19857387 C1    4/2000
FR        2892369 A3    4/2007
JP      2008143279 A    6/2008

OTHER PUBLICATIONS

French Search Report for French App. No. 1858174 dated May 15, 2019, 8 pages, (no English translation available).

*Primary Examiner* — Shin H Kim
(74) *Attorney, Agent, or Firm* — Barnes & Thornburg LLP

(57) ABSTRACT

The present disclosure relates to a vehicle seat comprising a seating portion, a backrest with a front face and which extends in a main direction Z and which has a hole for the upward exit of a seat belt from the backrest and a support which the seat belt bears against in order to descend along the front face of the backrest, and a headrest mounted on the backrest and slidable relative to the rest of the backrest along the main direction Z. The support is slidable relative to the rest of the backrest along the main direction Z, and the seat comprises a drive mechanism capable of simultaneously causing the headrest to slide along the main direction for a first amplitude A1 and the support for a second amplitude A2 different from the first amplitude A1, and an actuator able to actuate the drive mechanism.

7 Claims, 2 Drawing Sheets

(51) Int. Cl.
    *B60R 22/20*     (2006.01)
    *B60N 2/68*     (2006.01)
    *B60R 22/18*     (2006.01)

(56) References Cited

U.S. PATENT DOCUMENTS

| | | | | |
|---|---|---|---|---|
| 5,988,759 | A * | 11/1999 | Bauer | B60N 2/688 |
| | | | | 297/483 |
| 6,290,299 | B1 * | 9/2001 | Frisch | B60N 2/0232 |
| | | | | 297/410 |
| 8,807,658 | B2 * | 8/2014 | Ott | B60R 22/20 |
| | | | | 297/483 |
| 10,308,213 | B2 * | 6/2019 | Faruque | B60N 2/809 |
| 2020/0079264 | A1 * | 3/2020 | Hammadi | B60N 2/829 |
| 2020/0180555 | A1 * | 6/2020 | Kim | B60R 22/3405 |
| 2020/0282865 | A1 * | 9/2020 | Samain | B60N 2/66 |

* cited by examiner

VEHICLE SEAT WITH SIMULTANEOUS CONTROL OF THE HEADREST AND BELT SUPPORT

PRIORITY CLAIM

This application claims priority to French Application No. 18 58174, filed Sep. 12, 2018, which application is hereby incorporated in its entirety herein.

BACKGROUND

The present disclosure relates to seat, and particularly to a vehicle seat. More particularly, the present disclosure relates to a vehicle seat including a seating portion and a backrest.

SUMMARY

According to the present disclosure, a vehicle seat comprises a seating portion, backrest portion, and a headrest mounted on the backrest. The backrest portion includes a front face which extends in a main direction A.

In illustrative embodiments, the front face of the backrest has a hole for the upward exit of a seat belt from the backrest and a support which the seat belt bears against in order to descend along the front face of the backrest, and the headrest is slidable relative to the rest of the backrest along the main direction Z.

In illustrative embodiments, vehicle seats, especially for motor vehicles, are generally provided with a headrest which is mounted on the backrest of the seat. The backrest extends in a main direction Z, which is substantially the vertical direction when the backrest is in the usual position. This headrest is slidable relative to the rest of the backrest along the main direction Z, which allows the seat user to adjust the headrest for optimal comfort. This sliding is done manually, or automatically by means of a motor that can be user-actuated by the use of an actuator.

In illustrative embodiments, the vehicle seats are also provided with a seat belt, which is wound on a reel attached to the seat. The belt exits the backrest from an exit which is located for example on the rear face of the seat and exits in the upward direction of the backrest. The belt runs around a support (also called a strap exit) which constitutes an upper portion of the seat, and thus changes direction by about 180° in order to descend along the front face of the seat.

In illustrative embodiments, this support is usually located on a side of the seat above the shoulder of the user sitting on the seat, so that the belt passes over this shoulder as it returns to the front face of the seat and descends diagonally along the user's torso.

In illustrative embodiments, because users are not the same size or the same build, a given position of the belt is not suitable for all users, user comfort not being maximized for this position. In addition, user safety is not maximized in case of impact of the vehicle with an obstacle, because the positions of the headrest and the support are not optimal for a given user size and build.

In illustrative embodiments, the present disclosure aims to provide a vehicle seat where the comfort and safety of the user are maximized and simplified. This is achieved by virtue of the the support being slidable relative to the rest of the backrest along the main direction Z, and that the seat comprises a drive mechanism capable of simultaneously causing the headrest to slide along the main direction Z for a first amplitude A1 and the support for a second amplitude A2 different from the first amplitude A1, and an actuator able to actuate the drive mechanism.

In illustrative embodiments, a seat user is able to position the headrest and the seat belt relative to his or her body in the most comfortable manner possible and for maximized user safety. In addition, these positions are achieved simultaneously with a single actuator, which is more convenient and faster for the user.

In illustrative embodiments, the drive mechanism comprises a single motor, a first reducer which is connected to the headrest, a second reducer which is connected to the support, and a control device, the motor being able to drive the first reducer and the second reducer when it receives the command from the actuator via the control device. The drive mechanism is thus simplified, since it comprises only one motor.

In illustrative embodiments, the drive mechanism comprises a first motor, a second motor, and a control device, the first motor being able to cause the headrest to slide and the second motor being able to cause the support to slide upon receiving the command from the actuator via the control device.

In illustrative embodiments, the drive mechanism comprises a selection mechanism which allows choosing the value of the first amplitude A1 and the value of the second amplitude A2. As a result, the comfort of the seat user is thus maximized.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

In the following description, the directions "up" and "down", "low" and "high" are defined in reference to the main axis Z, in the usual direction relative to the vertical.

Figure 1:
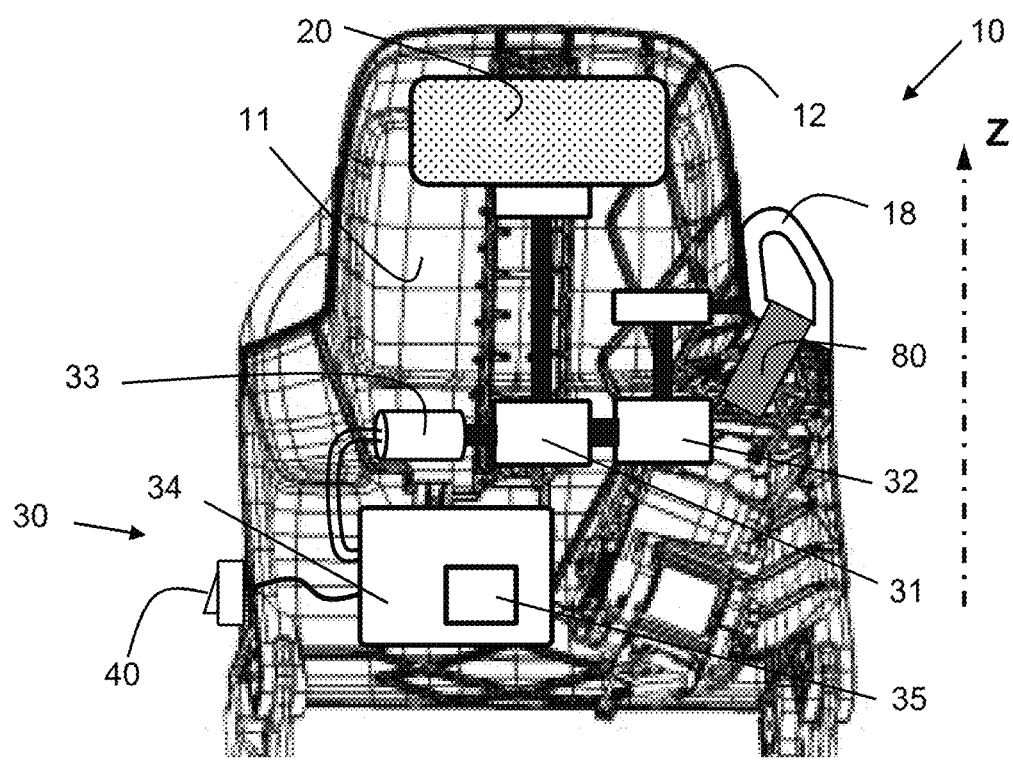
FIG. 1 is a schematic view of a backrest of a seat according to the present disclosure, with the headrest and the belt support in the low position.

FIG. 1 shows a vehicle seat comprising a seating portion (not shown), and a backrest 10 with a front face 11 and rear face 12 and which extends in a main direction Z. The main direction Z is substantially a vertical direction in the normal position for a user to use the seat, for example a driver or a passenger of the vehicle.

The seat comprises a seat belt 80 which is wound on a reel attached to the seat.

The backrest 10 has a hole for the upward exit from the backrest 10 of the seat belt 80 from the reel, and a support 18 which the seat belt 80 bears against in order to descend along the front face 11 of the backrest. Thus the support 18 (also called "strap exit") also acts as a guide for the seat belt 80. For example, the exit hole for the belt is located on the rear face 12 of the backrest 10, as partially illustrated in FIG. 1 (the hole is not visible as the rear face 12 is hidden).

The support 18 constitutes an upper portion of the seat such that the belt 80 thus changes direction by about 180° after exiting the seat (from the reel) in order to descend along the front face 11 of the seat.

This support 18 is generally located on a side of the seat above the shoulder of the user sitting on the seat, so that the belt passes over this shoulder as it returns to the front face 11 of the seat and descends diagonally along the user's torso.

Figure 2:
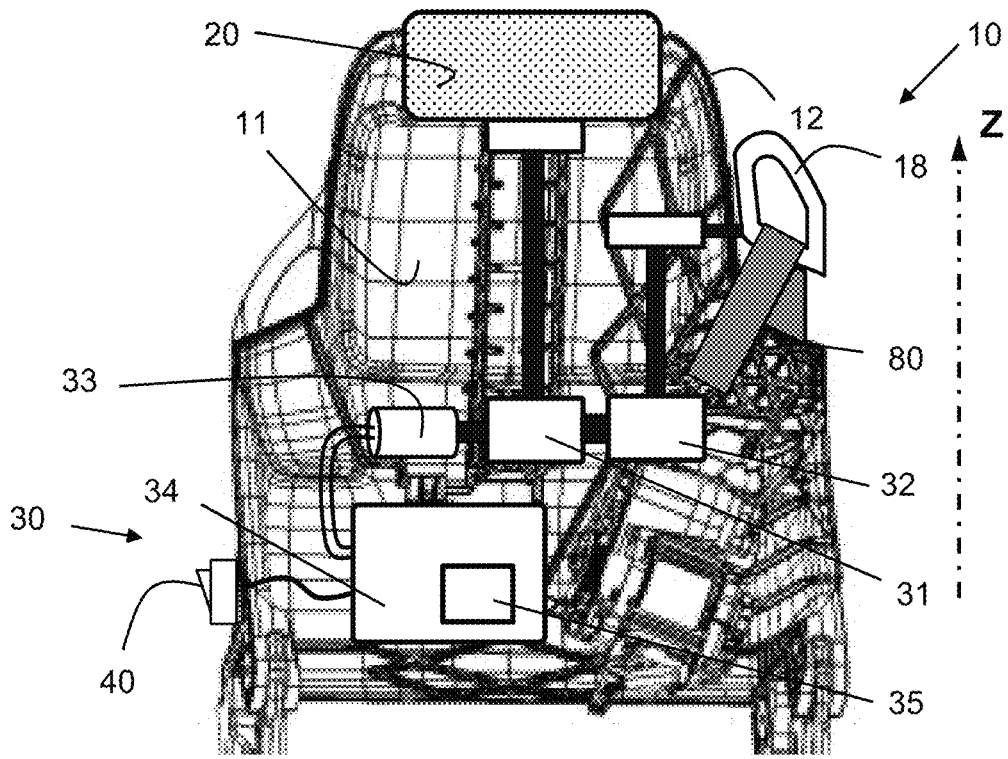
FIG. 2 is a schematic view of a backrest of a seat according to the present disclosure, with the headrest and the belt support in the high position.
Figure 3:
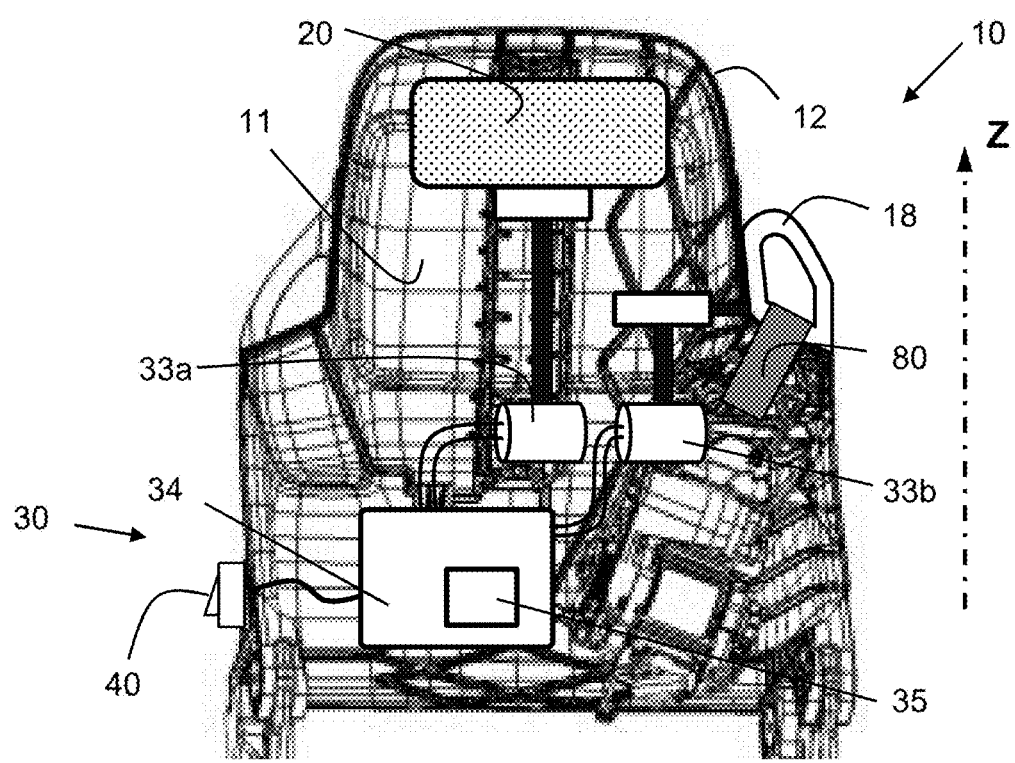
FIG. 3 is a schematic view of a backrest of a seat according to a variant of the present disclosure, with the headrest and the belt support in the low position.

The seat belt 80 is partially represented and shaded with gray in FIG. 1 (and in FIG. 2 and FIG. 3).

The seat also comprises a headrest 20 mounted on the backrest 10 and slidable relative to the rest of the backrest 10 along the main direction Z.

The seat comprises a drive mechanism 30 capable of simultaneously causing the headrest 20 to slide along the main direction Z for a first amplitude A1 and the support 18 for a second amplitude A2. The second amplitude A2 is different from the first amplitude A1 at a given time t after actuation of the drive mechanism. For example, the drive mechanism 30 is fixed on the backrest 10, as shown in FIG. 1

For example, the drive mechanism 30 comprises a single motor 33, a first reducer 31 which is connected to the headrest 20, and a second reducer 32 which is connected to the support 18, the motor 33 being able to drive the first reducer 31 and the second reducer 32 simultaneously.

Reducer, for example, is a mechanism that is capable of altering a speed, in other words of reducing or increasing a speed. In the first case the speed that is output by the reducer is reduced compared to the speed that is input to the reducer, in the second case the speed that is input to the reducer is reduced compared to the speed that is output by the reducer. In both cases there is a reduction in speed between one side and the other of the reducer, which justifies the use of the term reducer to cover these two cases.

For example, the reducer comprises gears that make it possible to modify the speed. For example, the reducer uses gears of different diameters, or a worm screw and worm wheel assembly.

The use of two separate reducers for the headrest 20 and the support 18 makes it possible to obtain two different amplitudes A1 and A2.

The drive mechanism 30 also comprises a control device 34 which controls the motor 33. The control mechanism 34 comprises the electronic elements necessary to control the motor 33.

The connection between the first reducer 31 and the headrest 20, and the connection between the second reducer 32 and the support 18, consists of a mechanical transmission, for example by means of a gear, a belt, a worm screw.

The first reducer 31 and the second reducer 32 are connected in series to the motor 33, as represented in FIG. 1, in other words the second reducer 32 is connected to the first reducer 31, as represented in FIG. 1.

Alternatively, the first reducer 31 and the second reducer 32 are connected in parallel to the motor 33, in other words the first reducer 31 and the second reducer 32 are each connected to the motor 33.

The seat comprises an actuator 40 which is able to actuate the drive mechanism 30 in order to stop or start the movement of the headrest 20 and of the support 18. The actuator 40 is connected (electrically) to the control mechanism 34 so as to be able to control the motor 30.

For example, the actuator 40 is mounted on the backrest 10.

Actuator 40 is, for example, an element which has at least two positions, an off position and an on position.

Thus, changing the actuator 40 from the off position to the on position starts the rotation of the motor 33 by means of the control mechanism 34. This rotation of the motor 33 drives the first reducer 31 and the second reducer 32, which causes the respective sliding of the headrest 20 and the support 18 via mechanical transmissions (represented by thick black lines in FIGS. 1 and 2).

For example, the actuator 40 is a switch, as represented in FIG. 1.

Alternatively, the actuator 40 is a button; a first press on the button actuates the motor and a second press stops the motor 33.

In the off position, the drive mechanism 30 is stationary and there is no movement of the headrest 20 or the support 18.

In the on position, the drive mechanism 30 drives and moves the headrest 20 and the support 18.

The drive mechanism 30 is able to cause the headrest 20 to slide at a first speed V1 and the support 18 at a second speed V2 different from the first speed V1.

FIG. 1 shows the seat with the headrest 20 and the support 18 in the initial low position (relative to the rest of the seat).

FIG. 2 shows the seat with the headrest 20 and the support 18 in the final high position, in other words after actuating the actuator 40 and then stopping the headrest 20 and the support 18 in their final positions.

The drive mechanism 30 is configured such that the motor 33 stops automatically when the headrest 20 reaches the first amplitude A1 and the support 18 reaches the second amplitude A2. In this case, the time t1 taken by the headrest 20 to reach the first amplitude A1 and the time t2 taken by the support 18 to reach the second amplitude A2 are necessarily equal. The following relation between amplitudes A1 and A2 and speeds V1 and V2 is therefore satisfied: t1=A1/V1=A2/V2=t2.

The drive mechanism 30 comprises a selection mechanism 35 which allows choosing the value of the first amplitude A1 and the value of the second amplitude A2.

Thus, it is possible to choose the ratio between the amplitude A1 of the displacement of the headrest 20 and the amplitude A2 of the displacement of the support 18. The comfort of the seat user is then maximized, because the user can make an adjustment to the amplitudes by which the headrest 20 and the support 18 will move when he or she actuates the actuator 40. Thus, with a single actuation of the actuator 40, the user can automatically position the headrest 20 and support 18 at their positions to maximize user's comfort.

In one particular case, the two amplitudes A1 and A2 can be equal.

The selection mechanism 35 is for example integrated with the control mechanism 34.

The selection mechanism 35 further allows choosing the value of the first speed V1 and the value of the second speed V2.

The user can thus more quickly obtain the positioning of the headrest 20 and the support 18 (and therefore of the belt 80) at their desired positions.

An alternative embodiment of the present disclosure is represented in FIG. 3. In this case, the drive mechanism 30 comprises two motors, one dedicated to the movement of the headrest 20 and the other to the movement of the support 18.

The drive mechanism 30 thus comprises a first motor 33a, a second motor 33b, and a control device 34, the first motor 33a being able to cause the headrest 20 to slide and the second motor 33b being able to cause the support 18 to slide upon receiving the command from the actuator 40 via the control device 34.

The first motor 33a and second motor 33b are each electrically connected to the control device 34, and are actuated simultaneously by the control device 34 upon receiving the command from the actuator 40. In FIG. 3 each motor is schematically represented as connected to the headrest 20 or support 18 by a mechanical transmission. Each of these mechanical transmissions may comprise a reducer (not shown).

The first motor 33a and the second motor 33b each rotate at a different speed. Thus, at the end of the time t which has elapsed between the actuation of the actuator 40 in order to actuate these motors and the stopping of these motors, the headrest 20 has moved for a first amplitude A1 and the support 18 has moved for a second amplitude A2 distinct from the first amplitude A1.

The invention claimed is:

1. A vehicle seat comprising
a seating portion, a backrest with a front face and which extends in a main direction Z and which has a hole for the upward exit of a seat belt from said backrest and a support which said seat belt bears against in order to descend along said front face of the backrest, and a headrest mounted on said backrest and slidable relative to the rest of said backrest along the main direction Z, said seat being characterized in that said support is slidable relative to the rest of said backrest along the main direction Z, and in that it comprises a drive mechanism capable of simultaneously causing said headrest to slide along said main direction Z for a first amplitude A1 and the support for a second amplitude A2 different from the first amplitude A1, and an actuator able to actuate said drive mechanism.

2. The vehicle seat of claim 1, wherein said drive mechanism comprises a single motor, a first reducer which is connected to the headrest, a second reducer which is connected to the support, and a control device, said motor being able to drive the first reducer and the second reducer when it receives the command from said actuator via said control device.

3. The vehicle seat of claim 2, wherein the drive mechanism comprises a selection mechanism which allows choosing the value of the first amplitude A1 and the value of the second amplitude A2.

4. The vehicle seat of claim 1, wherein the drive mechanism comprises a first motor, a second motor, and a control device, the first motor being able to cause said headrest to slide and the second motor being able to cause said support to slide upon receiving the command from said actuator via said control device.

5. The vehicle seat of claim 4, wherein the drive mechanism comprises a selection mechanism which allows choosing the value of the first amplitude A1 and the value of the second amplitude A2.

6. The vehicle seat of claim 1, wherein the drive mechanism (30) comprises a selection mechanism (35) which allows choosing the value of the first amplitude A1 and the value of the second amplitude A2.

7. The vehicle seat of claim 6, wherein the drive mechanism comprises a selection mechanism which allows choosing the value of the first amplitude A1 and the value of the second amplitude A2.

* * * * *